United States Patent

[11] 3,587,931

| [72] | Inventors | Henry E. Studer;<br>Harold P. Olmo, Davis, Calif. |
|---|---|---|
| [21] | Appl. No | 842,474 |
| [22] | Filed | July 17, 1969 |
| [45] | Patented | June 28, 1971 |
| [73] | Assignee | The Regents of the University of California<br>Berkeley, Calif. |

[54] MACHINE FOR DEPOSITING GRAPES
8 Claims, 2 Drawing Figs.

[52] U.S. Cl. .................................................. 222/176,
   222/192
[51] Int. Cl. ...................................................... A01c 15/00
[50] Field of Search .......................................... 222/176,
   192; 242/86.52; 118/305; 94/44; 156/369; 34/90,
   160

[56] References Cited
UNITED STATES PATENTS
1,613,051  1/1927  Napier ........................... 94/44

Primary Examiner—Lloyd L. King
Assistant Examiner—Thomas C. Culp, Jr.
Attorney—Lothrop & West ABSTRACT: A machine for depositing individual grapes has an advancing frame depositing a sheet of paper onto the ground. Grapes received in a storage hopper are metered out onto a belt conveyor carrying the grapes rearwardly and discharging them to lie in a uniform layer on the paper. The grapes being discharged may be sprayed with a treatment liquid.

PATENTED JUN28 1971 3,587,931
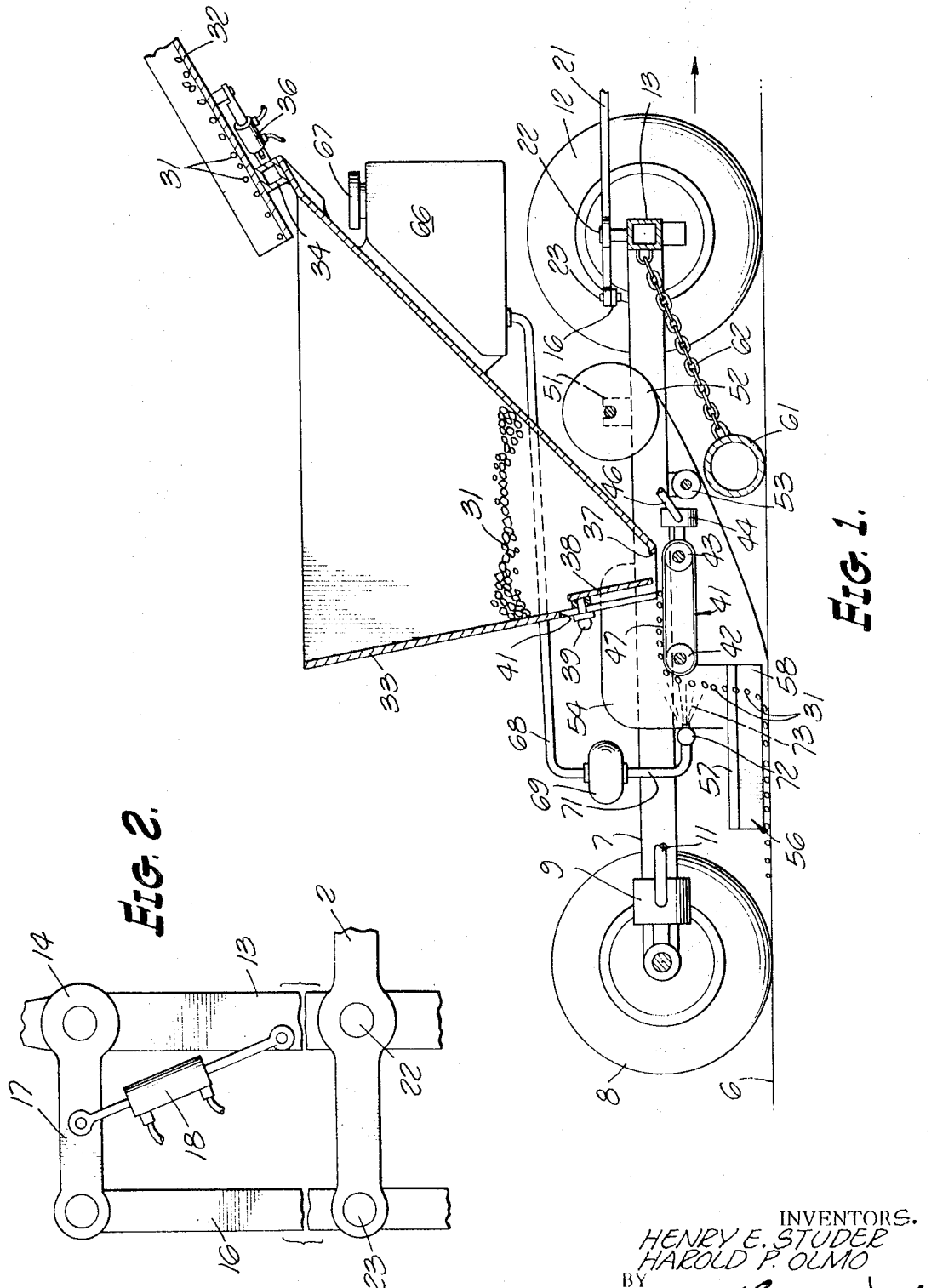
INVENTORS.
HENRY E. STUDER
HAROLD P. OLMO
BY
Lothrop & West
ATTORNEYS

MACHINE FOR DEPOSITING GRAPES

In the increasing mechanization of agricultural work, particularly harvesting, it has become apparent that the time honored fashion for providing raisins is a great consumer of time and energy. Presently the grapes are furnished in the form of small clusters which are placed in trays left on the ground between the vine rows to dry in the sun. The grape clusters, so deposited together with some individual berries, are customarily turned in order that there may be a more nearly uniform exposure of the grapes to the sun for drying and raisining.

It is therefore an object of the invention to provide a machine for disposing grapes for drying in the sun to produce raisins in a fashion which reduces substantially the amount of labor required to deposit and to turn the grapes and which will afford a generally uniform, mechanically conducted way of exposing grapes to raisining treatment.

In our copending application filed Jan. 11, 1967 with Ser. No. 608,573, now U.S. Pat. No. 3,492,801 issued Feb. 3, 1970 we have disclosed a manner of culturing and harvesting grapes so that it is possible to detach the grape berries from their clusters in almost entirely individual form; that is, the individual berries are not connected with other berries.

It is a further object of our invention, therefore, to provide a means for handling individual berries for drying as raisins.

Other objects, together with the foregoing, are attained in the embodiment of the invention described in the accompanying description and illustrated in the accompanying drawings in which:

FIG. 1 is a diagrammatic view in cross section on a longitudinal vertical plane showing a grape depositing machine pursuant to our invention, FIG. 2 is a plan of an alternate steering mechanism, portions being broken away.

In the form of machine particularly chosen for disclosure herein, reference is had to the deposit of individual grapes for raisining, but it is to be understood that the same mechanism has related uses in other fields wherever it is desired to deposit an appropriate layer of product on a subjacent bearing material.

As especially developed for commercial use, the machine is designed for operation on the ground 6. This is customarily in a vineyard and represents the ground surface between adjacent longitudinal rows of grape vines. The machine itself includes a frame 7 of the customary metal shapes supported at the rearward end by ground-engaging wheels 8 provided with a drive mechanism 9. This conveniently is a hydraulic motor receiving propulsion fluid through a line 11 under an appropriate manual speed control, not shown.

The forward end of the frame is supported on the ground by a pair of dirigible or steering wheels 12 of the customary sort mounted at the ends of a transverse axle 13 and having steering knuckles 14 connected to a tie rod 16 by steering arms 17. The machine can be steered by a power steering jack 18 connected between the axle and steering arm, but likewise is steerable by an arrangement including a tongue 21 conveniently mounted on the axle 13 by a pivot 22 and likewise connected to the tie rod 16 by a pivot 23. The leading end of the tongue 21 can be connected to a grape harvesting machine of the sort disclosed in the above-identified application and patent.

Preferably the steering is accomplished either by the power steering jack 18 or by the tongue 21. For that reason either the jack 18 can by hydraulically neutralized when the tongue 21 is to be employed, or the pin 23 can be removed to disable the steering function of the tongue when the hydraulic jack 18 is to be employed. In any case it is preferred that the frame 7 advance between the rows of grapes immediately adjacent to a grape harvesting machine which discharges its product in the form of individual grape berries 31 through a trough conveyor 32.

Mounted on the frame 7 in a position beneath the discharged end of the trough conveyor 32 is a trapezoidal hopper 33 which extends for substantially the width of the frame 7 and is high enough so that the grapes discharged from the conveyor 32 do not have very far to fall. Preferably the hopper forward edge is reinforced by a transverse bar 34 on which the conveyor 32 can rest. The usual conveyor 32 is somewhat narrower than the hopper. The hopper is supplied more or less evenly with the grapes discharged from the trough by manually moving the trough from side to side during the operation of the machine or by providing a hydraulic cylinder 36 interconnected to the bar 34 and the trough periodically to oscillate the trough transversely of the machine to distribute the grapes throughout the hopper.

Grapes accumulate in the hopper to a greater or lesser extent depending upon the variations in the supply of the grapes. This, in some vineyards, is reasonably uniform so that the level in the hopper does not greatly vary. However, under other circumstances the discharge from the harvesting machine may be rather erratic. Consequently, the hopper 33 is made of sufficient capacity to serve as a surge chamber or a reservoir for evening out the discharge of grapes therefrom.

The lower end of the hopper is provided with a discharge opening 37 controlled by a movable, transversely extending plate 38 acting as a gate. The gate can be adjusted to any desired vertical position by manipulating a control knob 39 operating through a slot 41 in the forward wall of the hopper. The operator of the machine gauges the desired rate of efflux of grapes from the hopper and sets the plate 38 at a desired distance above the bottom of the opening 37. This varies the size of the opening and the amount of the grape material which can pass therethrough. Because the discharge is very nearly uniform, the grapes tend to discharge from the hopper in a layer which is of a desired dimension in a vertical direction and extends for substantially the full width of the hopper, which is itself substantially the same as the width of the frame 7.

Grapes leaving the hopper through the discharge opening 37 are received immediately below on a belt conveyor 41. This includes a belt trained around a pair of transversely extending, parallel rollers 42 and 43, the roller 43 preferably being driven by a hydraulic motor 44 having a manually variable speed control and supplied through a duct 46 from any suitable source and preferably driven in proportion to the frame advance speed. The belt 41 is consequently moved so that its upper run 47 is propelled in a rearward direction at a speed governed by the speed of the motor 44. The operator thus can vary the position of the plate 38 and can vary the speed of the upper run 47 of the conveyor to control the rate of efflux of the grapes from the hopper and their discharge over the roller 42. For a particular job, these variables are initially selected and usually then remain unchanged.

While it is possible to provide a series of trays, as now customarily provided, on the ground 6 beneath the machine to receive the discharged grapes it is preferred to provide on the frame 7 a mounting 51 for a roll 52 of paper or a similar sheet material such as plastic. The sheet is conveniently led off of the roll onto the ground 6 and its initial end is temporarily anchored. The sheet is in part guided onto the ground by an idler roller 53 depending from the frame and normally lies in position without any extra holding or securing means. As the frame 7 advances, the sheet is drawn off the roll and lies on the ground beneath the conveyor 41 and beneath the discharging grapes falling the short distance from the roller 42. The width of the sheet available usually controls the designed width of the frame 7 and the similar width of the conveyor 41.

There is discharged onto the underlying sheet a layer of grapes of a uniform depth of perhaps one or two or three berries high and a uniform width slightly less than the width of the sheet. The uniformity of the deposited grape layer is of great importance in the successful raisining process.

The grapes leaving the conveyor 41 to fall onto the sheet are laterally or transversely confined during their travel by longitudinal sideboards 54 disposed on the frame 7 at opposite sides of the machine and serving as barriers to preclude lateral loss of the grape berries. The sideboards likewise extend from a point considerably above the upper run 47 downwardly toward the ground 6 and conveniently terminate in side retainers 56. These each have a reinforcing rib 57 along the upper horizontal edge and include rubberlike depending aprons 58 designed to extend down substantially into contact with the sheet on the ground. The retainers have the effect of laterally confining the grapes so that they do not roll over the edges of the sheet. The retainers can also be sufficiently stiff as to impress slight channels or bends or grooves in the sheet so that edges thereof tend to tip upwardly slightly. This assists in keeping any of the ground from getting onto the sheet and of course is of use in confining the grape berries.

While the ground 6 on which the sheet is deposited is usually sufficiently flat or planar properly to receive the grapes, in many cases a drag 61 is provided. This is usually a transversely extending, reasonably heavy circular cylindrical pipe secured to the axle 13 by intervening chains 62 and so drawn forward. The drag 61 is effective immediately in advance of the laying of the sheet to provide a smooth surface. The drag can have something other than a rectilinear contour so that the ground beneath the sheet can, if desired, be slightly crowned or can be slightly troughed to meet the preferred operating contingencies. The sheet with the potential raisins deposited thereon then partakes of the matrix shape provided by the ground and takes on the desired transverse contour.

The operation of the machine as so far described is effective to provide a layer of grapes uniform in depth and width on a sheet of material lying on the ground in a desired configuration.

In some instances, although not in all cases, it is desired to treat the grapes with an additive. For example, it has been found that the grapes turn into raisins much more quickly if they are provided with a coating of a material such as calcium carbonate. Also, it is sometimes desired to add a mold growth inhibitor to the grapes. For that reason there is mounted on the frame 7 a liquid tank 66 having a filler 67 and designed to discharge through a duct 68 into a metering pump 69. The pump is appropriately driven at a desired rate by means (not shown) under the control of the operator. The metering pump 69 discharges through a pipe 71 leading to a cross manifold 72 from which the liquid contents can emerge as a spray 73 directed largely toward the grapes as they fall from the conveyor 41 onto the subjacent sheet. The manifold 72 extends almost entirely across the frame so that all of the falling grapes are subjected to an adequate liquid spray treatment. If desired, a comparable device for applying a treatment dust to the grapes may be similarly provided.

It has been found in practice that grapes harvested particularly in accordance with the method set forth in our copending application and patent above identified can be received by the present machine even though the reception is at a variable rate. The hopper acts as a reservoir and the speed of advance of the depositing machine is either exactly the same as that of the harvester since they are coupled together, or is very nearly the same since the drive motor 9 is regulated to that effect. The longitudinal extent of the hopper is sufficient however, that when the machines are not coupled mechanically together, the depositing machine can be advanced and retracted slightly with regard to the harvester thus acting further to distribute the grapes within the hopper. In all events a uniform discharge of grapes occurs through the hopper outlet and from the conveyor belt so that a uniform layer of grapes is deposited on the sheet on the ground.

It has been determined that if such layer is of a shallow depth, that is one or two or three grapes in depth and not more, then the drying is sufficiently uniform throughout so that there is no turning operation necessary and a great deal of labor is saved. It has also been determined that with the usual grape yield from a vineyard, the width of the layer deposited can be sufficient to accommodate all of the grapes in a favorable position between the vine rows so that the entire width of the layer is subject to the drying sun.

We claim:
1. A machine for depositing grapes comprising a frame adapted to travel forwardly over the ground, means on said frame for supporting a roll of sheet material in position to discharge onto and lie on the ground beneath said frame, a hopper mounted on said frame having a discharge opening adjacent the bottom thereof, a belt conveyor mounted on said frame with the upper run of said conveyor disposed below and extending from said opening, side boards on said frame extending from the upper run of said conveyor substantially to said ground, and means on said frame for varying the size of said discharge opening.

2. A machine as in claim 1 in which said side boards extend longitudinally of said frame adjacent the side edges of said sheet material on the ground and trailing said belt conveyor discharge.

3. A machine as in claim 1 in which said frame is provided with means of supporting a supply conveyor in various different positions transversely of said frame and above said hopper.

4. A machine as in claim 1 including means for advancing said frame over the ground, and independent means for driving said belt conveyor.

5. A machine as in claim 1 including means for discharging a treatment material onto grapes travelling between said discharge opening and said sheet material on the ground.

6. A machine as in claim 1 in which said discharge opening and said hopper are substantially as wide as said sheet material.

7. A machine as in claim 1 in which the margins of said discharge opening are substantially uniformly spaced above said upper run of said conveyor at successive points transversely of said frame.

8. A machine as in claim 4 in which means are provided for driving said belt conveyor at a speed having a selected ratio to the speed of advance of said frame over the ground.